3,390,202
PROMOTED CATALYSTS FOR THE
OXIDATION OF OLEFINS
James L. Callahan, Bedford Heights, Robert K. Grasselli, Garfield Heights, and Warren R. Knipple, Bedford, Ohio, assignors to The Standard Oil Company, Cleveland, Ohio, a corporation of Ohio
No Drawing. Continuation-in-part of applications Ser. No. 311,657, Sept. 26, 1963, and Ser. No. 604,118, Dec. 23, 1966. This application May 15, 1967, Ser. No. 638,577
10 Claims. (Cl. 260—680)

ABSTRACT OF THE DISCLOSURE

Diolefins such as butadiene are produced by the oxidative dehydrogenation of monoolefins such as butene-2 in the presence of an antimony oxide-uranium oxide catalyst containing at least one of a number of specified promoter elements.

This is a continuation-in-part of our copending application Ser. No. 604,118, filed Dec. 23, 1966, and this is also a continuation-in-part of our copending application Ser. No. 311,657, filed Sept. 26, 1963, now U.S. Patent No. 3,328,315.

This invention relates to promoted oxidation catalysts containing the elements of antimony and uranium and more particularly pertains to antimony-uranium catalysts containing minor amounts of an element or elements selected from Groups I–A, I–B, II–A, II–B, III–B, IV–A, IV–B, V–B, VII–B and V–III of the Periodic Table. The catalysts of the present invention are particularly useful in the oxydehydrogenation of olefins having from 4 to 8 carbons, such as butene-1, to diolefins, such as butadiene-1,3.

The base antimony-uranium oxide catalyst useful in the present invention is more fully described in U.S. Patent No. 3,198,750. Attrition resistant catalysts of these types are described more completely in the copending U.S. patent application of James L. Callahan and Warren R. Knipple, Ser. No. 279,308, filed May 9, 1963, now U.S. Patent No. 3,341,471. The base catalyst consists essentially of the oxides of uranium and antimony. The exact nature of the chemical compound or compounds which compose the catalyst of this invention is not known. The catalyst may be a mixture of antimony oxide or oxides and uranium oxide or oxides. It is also possible that the antimony and uranium are combined with the oxygen to form an antimonate or uranate. X-ray examination of the catalyst has indicated the presence of a structurally common phase of the antimony type, comprised of animony oxide and some form of uranium oxide. For the purpose of the description of the invention, the base catalyst will simply be referred to as a mixture of antimony and uranium oxides, but this is not to be construed as meaning that the catalyst is composed either in whole or in part of these compounds.

The proportions of antimony and uranium in the base catalyst may vary widely. The Sb:U atomic ratio can range from about 1:50 to about 99:1. However, optimum activity appears to be obtained at Sb:U atomic ratios within the range from 1:1 to 25:1.

It is preferred that the catalysts of this invention be combined with from 10 to 90% by weight of a silica support.

The antimony oxide and uranium oxide can be blended together, or can be formed separately and then blended or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, metaantimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid, such as nitric acid.

The uranium oxide component can be provided in the form of uranium oxide or by precipitation in situ from a soluble uranium salt such as the nitrate, acetate, or a halide such as the chloride. Uranium metal can be used as a starting material, and if antimony metal is also employed, the antimony can be converted to the oxide and uranium to the nitrate simultaneously by oxidation in hot nitric acid. A slurry of hydrous antimony oxide formed in situ from the metal in nitric acid also can be combined with a solution of a uranium salt such as uranium nitrate, which is then precipitated in situ as uranium oxide by the addition of ammonium hydroxide. The ammonium nitrate and any other soluble salts are removed by filtration of the resulting slurry or by thermal decomposition.

It will be apparent from the above that uranium tribromide, uranium tetrabromide, uranium trichloride, uranium tetrachloride, uranium pentachloride, uranium hexafluoride, uranium tetraiodide, uranyl nitrate, uranyl sulfate, uranyl chloride, uranyl bromide, uranium trioxide, and uranium peroxide can be employed as the source of the uranium oxide component.

The catalytic activity of the system is enhanced by heating at an elevated temperature. Preferably, the catalyst mixture is dried and heated at a temperature of from about 500 to about 1150° F., preferably at about 700 to 900° F., for from two to twenty-four hours. If activity then is not sufficient, the catalyst can be further heated at a temperature above about 1000° F. but below a temperature deleterious to the catalyst at which it is melted or decomposed, preferably from about 1400° F. to about 1900° F., for from one to forty-eight hours, in the presence of air or oxygen. Usually this limit is not reached before 2000° F. and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-uranium oxide base catalyst composition useful in the invention can be defined by the following empirical formula:

$$Sb_aU_bO_c$$

wherein $a$ is 1 to 99, $b$ is 50 to 1, and $c$ is a number taken to satisfy the average valences of antimony and uranium in the oxidation states in which they exist in the catalyst as defined by the empirical formula above. Thus, the Sb valence may range from 3 to 5 and the U valence from 4 to 6.

The oxidative dehydrogenation of olefins to diolefins and aromatics

In accordance with the present invention, this promoted catalyst system is employed in the catalytic oxidative dehydrogenation of olefins to diolefins and aromatic compounds. In the process, the feed stream in vapor form containing the olefin to be dehydrogenated and oxygen is conducted over the promoted catalyst at a comparatively low temperature to obtain the corresponding diolefin or aromatic compounds.

By the term "olefin" as used herein is meant the open chain as well as cyclic olefins. The olefins dehydrogenated in accordance with this invention have at least four and up to about eight nonquaternary carbon atoms, of which at least four are arranged in series in a straight chain or ring. The olefins preferably are either normal straight chain or tertiary olefins.

Among the many olefinic compounds which can be dehydrogenated in this way are butene-1, butene-2, pentene-1, pentene-2, tertiary pentenes and hexenes having one tertiary carbon atom, such as 2-methyl-pentene-1, 3-methyl-butene-1, 3,4-dimethyl-pentene-1, 4-methyl-pentene-2, heptene-1, octene-1, cyclopentene, cyclohexene, 3-methyl cyclohexene and cycloheptene.

Open chain olefins yield diolefins and, in general, six-membered ring olefins yield aromatic ring compounds. The higher molecular weight open chain olefins may cyclize to aromatic ring compounds.

The feed stock, in addition to the olefin and oxygen, can contain one or more paraffinic or naphthenic hydrocarbons having up to about 10 carbon atoms, which may be present as impurities in some petroleum hydrocarbon stocks and which may also be dehydrogenated in some cases. In this oxidative dehydrogenation reaction, propylene and isobutylene should not be included in the feed in substantial amounts.

The amount of oxygen should be within the range of from about 0.3 to about 3 moles per mole of olefin. Stoichiometrically, 0.5 to 1.5 moles of oxygen per mole of olefin is required for the dehydrogenation to diolefins and aromatics, respectively. It is preferred to employ an excess of oxygen, from 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture, such as steam, carbon dioxide, or nitrogen.

The feed stock is preferably catalytically dehydrogenated in the presence of steam, but this is not essential. Usually, from about 0.1 to about 6 moles of steam per mole of olefin reactant is employed but amounts larger than this can be used.

The dehydrogenation proceeds at temperatures within the range of from about 325° C. to about 1000° C. Optimum yields are obtainable at temperatures within the range from about 400 to 550° C. However, since the reaction is exothermic, temperatures in excess of 550° C. should not be used unless means are provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range of from about 5 to about 75 p.s.i.g. Higher pressures up to about 300 p.s.i.g. can be used and have the advantage of simplifying the product recovery.

Only a brief contact time with the catalyst is required for effective dehydrogenation. The apparent contact time with the catalyst can vary from about 0.5 up to about 50 seconds, but higher contact times can be used if desired. At these contact times comparatively small reactors and small amounts of catalyst can be used effectively.

In general, any apparatus of the type suitable for carrying out oxidation reactions in the vapor phase may be employed in the execution of these processes. The processes may be conducted either continuously or intermittently. The catalyst bed may be a fixed bed employing a large particulate or pelleted catalyst or, in the alternative, a so-called "fluidized" bed of catalyst may be employed.

The reactor may be brought to the reaction temperature before or after the introduction of the reaction feed mixture. However, in a large scale operation, it is preferred to carry out the process in a continuous manner, and in such a system the recirculation of the unreacted olefin is contemplated.

The promoter element or elements may be added to the base catalyst in amounts ranging from 0.01 to about 20% by weight based on the weight of the promoted base catalyst. Combinations of two or more promoter elements is contemplated to be within the scope of the present invention. The promoters may be incorporated into the base catalyst by co-precipitation or impregnation. Promoter elements are conveniently added in the form of their nitrates or other salts. In any event, the promoter elements, like the antimony and uranium, probably exist in the final active catalyst in the form of their oxides.

Specific elements which are useful promoters in combination with the base catalysts are bismuth, tin, indium, platinum, boron, magnesium, silver, iron, zirconium, copper, thorium, zinc, cadmium, cobalt, nickel, rhenium, barium, lead, arsenic, tungsten, phosphorous, aluminum, cerium, calcium, antimony, cesium, iridium and palladium. Most preferred promoter elements are bismuth, tin, platinum, boron, magnesium, silver, iron, zirconium, copper, thorium, zinc, cobalt, nickel, lead, arsenic, tungsten, phosphorous, aluminum, calcium, antimony, cesium, tantalum, germanium, lithium, cadmium, barium, palladium and indium.

The process of the present invention is further illustrated in the following examples wherein the amounts of ingredients are expressed as parts by weight unless otherwise indicated.

EXAMPLE I 90 grams of antimony metal were completely oxidized in 360 mls. of concentrated nitric acid. 81.4 grams of $UO_2(NO_3)_2 \cdot 6H_2O$ and 228 grams of duPont Ludox HS (30% by weight of $SiO_2$ in water) were mixed into the acidic mixture. By addition of concentrated ammonium hydroxide the slurry was brought to a pH of 8. The precipitate was filtered and washed and then divided into four portions. At this point different promoter elements in different amounts ranging from about 1 to 10% by weight based on the weight of the active base catalyst were incorporated into each of these fractions. To the wet filter cake was added a specified quantity of the promoter element nitrate, oxide, sulfate, or chloride dissolved in a minimum amount of water, and the mixture was then blended or mixed together to give a uniform distribution. Each catalyst was then dried at 120° C. and calcined at 800° F. Finally, the catalyst was activated at a temperature above 1000° F. This formulation produced a base catalyst of 70% by weight of $USb_{4.6}O_{11.8}$ and 30% by weight of silica.

126 grams of the above-described wet catalyst filter cake and 6.1 g. $Bi(NO_3)_3 \cdot 5H_2O$ were mixed together. The promoted catalyst was dried at 120° C. and calcined at 800° F. for 24 hours. It was then heat-treated at 1800° F. for 8 hours. Dry weight of the promoted catalyst containing 6.36% by weight of bismuth in the active component was 59 grams.

110 grams of the above-described wet catalyst filter cake and 2.6 grams of SnO were mixed together. The promoted catalyst was dried at 120° C. and calcined at 800° F. for 24 hours. It was then heat-treated at 1800° F. for 8 hours. Dry weight of the catalyst was 54 grams which contained 2.3 g. of Sn. The promoted catalyst contained 6.08% by weight of Sn in the active component.

2.7 grams of $In_2(SO_4)_3$ were treated with concentrated $NH_4OH$ and then the resulting material was filtered, washed and mixed with the wet catalyst filter cake described above. The promoted catalyst was dried at 120° C., calcined at 800° F. for 24 hours and heat-treated at 1800° F. for 8 hours. Dry weight of the promoted catalyst was 59 grams and the promoted catalyst contained 2.89% by weight of In based on the active component.

0.9 gram of PtCl₄ (in a 10% aqueous solution) was added to the wet catalyst filter cake. The promoted catalyst was dried at 120° C., calcined at 800° F. for 24 hours and heat-treated at 1800° F. for 8 hours. Dry weight of the promoted catalyst was 52 grams. The promoted catalyst contained 1.42% by weight of Pt based on the active component of the catalyst.

3.1 grams of H₃BO₃ were dissolved in water and added to the wet catalyst filter cake. The promoted catalyst was dried at 120° C., calcined at 800° F. for 24 hours and heat-treated at 1800° F. for 8 hours. Dry weight of the promoted catalyst was 57 grams. The promoted catalyst contained 1.36% by weight of B in the active component.

EXAMPLE II

An attrition resistant catalyst was prepared as follows:

180 grams of antimony metal were completely oxidized in 720 mls. of concentrated HNO₃. 162.8 grams of UO₂(NO₃)₂·6H₂O were added and the mixture was evaporated almost to dryness. 456.8 grams of duPont Ludox HS (a 30% by weight SiO₂ dispersion in water) were added and the mixture was brought to a pH of 8.0 by the addition of NH₄OH. The catalyst was filtered and washed with 600 ml. of water in two separate portions. The catalyst was then dried at 120° C., calcined at 800° F. for 24 hours and heat-treated at 1725° F. for 8 hours. 444 grams of the foregoing catalyst were mixed with 247 grams of Ludox, and the resulting product was extruded. The extrudate was dried at 120° C. and then heat-treated at 1725° F. for 72 hours.

25 grams of the above-described catalyst in the size range which would pass a 35 mesh screen but be retained on an 80 mesh screen, were mixed with a solution of 1.13 grams of In₂SO₄ in 10 mls. of water. This mixture was made basic with 5 mls. of 28% NH₄OH. It was then filtered and washed with 30 mls. of H₂O in three portions. The promoted catalyst was dried at 120° C., calcined at 800° F. for 2 hours and heat-treated at 1725° F. for 2 hours.

EXAMPLE III

The promoted catalysts prepared by the procedures given in Examples I and II were ested in the reaction of butene-2 with oxygen to produce butadiene. The reactor unit was made up of a feed induction system, a molten salt bath furnace, stainless steel microreactor containing 5 mls. of catalyst, microadsorption system and a vapor fractometer. In order to provide a steady feed stream and to maintain constant contact time, low pressure regulators (Moore Product Company; 0 to 50 inches of water) were used in connection with flow meters. The reactor was placed in the salt bath which was maintained at a constant temperature. Connections from the feed induction system to the reactor and from the reactor to the adsorption unit were made with silicone rubber seals.

All gases leaving the reaction were passed through a sintered glass tube into a half normal aqueous HCl solution. An internal standard was incorporated into the HCl solution by adding 5 ml. of methyl ethyl ketone per liter of solution. In order to ensure a minimal loss of product, the HCl solution was kept at ice bath temperature.

The catalyst volume in the reactor was 5 mls. In each case a 6 minute pre-run was conducted followed by a 12 minute run in which product was collected. The results of several runs wherein several types of promoted catalyst were used are given in Table I. In the analysis of butadiene obtained from butene-2, two gas chromatographic units were employed, a Fisher Gas Partitioner and a Burrell Kromo-Tog. The gas partitioner was equipped with a 4.5 foot column packed with 35% hexamethyl phosphoramide on firebrick and a 10 foot column packed with 13X molecular sieves (Linde). The carrier gas was helium at a flow rate of 45 cc./min. S.T.P. Detector current was 5 milliamperes. A 5 meter stainless steel column was employed in the Kromo-Tog, packed with β,β-oxydipropionitrile on firebrick. Carrier gas was helium at a flow rate of 27 cc./min. S.T.P. The reaction temperature was 860° F. The results of several runs are given in Table I.

TABLE I

| Percent Promoter in Catalyst | Percent Butene-2 in Air | Contact Time (Sec.) | Percent Per Pass Conversion of Butene-2 to Butadiene |
|---|---|---|---|
| Unpromoted | 4.40 | 3.7 | 40.2 |
| 1.42 Al | 10.15 | 3.9 | 48.4 |
| 1.42 Mg | 9.60 | 3.6 | 65.2 |
| 1.42 Zr | 8.05 | 4.0 | 52.9 |
| 1.42 Ca | 7.80 | 4.4 | 44.8 |
| 1.42 Th | 8.05 | 3.9 | 58.7 |
| 2.84 CaHPO₄ | 8.90 | 4.1 | 52.0 |
| 0.71 FePO₄ | 9.50 | 3.5 | 51.6 |
| .42 SbPO₄ | 8.10 | 3.8 | 49.5 |

All runs were conducted at 460° C. (860° F.). The butene-2 used was a mixture of 73% trans and 27% cis-butene-2.

EXAMPLE IV

In accordance with the procedures of Examples I and II, catalysts were prepared which were promoted with varying amounts of phosphoric acid, boron phosphate and aluminum phosphate. These catalysts were used in the reaction of oxygen with butene-2 described in Example III. The results are given in Table II.

TABLE II

| Catalyst Promoter | Percent Butene-2 in Air | Contact Time (Sec.) | Percent Per Pass Conversion of Butene-2 to Butadiene |
|---|---|---|---|
| Unpromoted | 10.35 | 4.0 | 51.6 |
| 6.77% P | 6.65 | 7.8 | 59.2 |
| 4.52% P | 6.15 | 7.1 | 57.3 |
| 0.45% P | 7.75 | 4.0 | 63.0 |
| 0.45% P | 7.75 | 3.8 | 71.1 |
| 0.023% P | 7.85 | 4.0 | 64.3 |
| 8.37% P+2.91% B | 6.90 | 3.70 | 65.6 |
| 2.09% P+0.73% B | 8.45 | 4.1 | 79.6 |
| 0.42% P+0.15% B | 10.30 | 4.0 | 68.3 |
| 0.84% P+0.29% B | 7.35 | 4.0 | 74.9 |
| 0.21% P+0.073% B | 6.65 | 6.1 | 80.2 |
| 0.73% P+0.63% Al | 7.00 | 3.7 | 71.5 |
| 0.18% P+0.16% Al | 7.90 | 3.7 | 86.0 |
| 0.36% P+0.32% Al | 7.80 | 3.7 | 70.8 |

EXAMPLE V

A feed of 2-methyl-butene-1:air:nitrogen in the molar ratio of 1:10–14:3–5, respectively, was passed over a fixed bed of catalyst prepared in accordance with the procedures of Examples I and II in a microreactor having a catalyst volume of 4.5 cc. at a temperature of 750° F. and at a contact time of 3.0 seconds. The per pass conversions to isoprene for the various promoted catalysts compared with the unpromoted catalysts are given in Table III.

TABLE III

| Promoter | Weight Percent Promoter | Percent Per Pass Conversion Isoprene |
|---|---|---|
| Unpromoted | | 43.2 |
| Mg | 1.76 | 44.8 |
| Pb | 2.70 | 46.2 |
| Ta | 1.1 | 49.8 |
| B | 0.95 | 51.0 |
| As | 1.05 | 45.8 |
| Zr | 5.2 | 44.7 |
| Cd | 6.1 | 55.1 |

We claim:
1. The process for the oxidative dehydrogenation of olefins comprising contacting a mixture of oxygen and an olefin having at least four and up to about eight nonquaternary carbon atoms of which at least four are arranged in a straight chain in the vapor phase at a temperature at which the oxidative dehydrogenation proceeds with a promoted catalyst composition consisting essentially of a base catalyst, a support and a promoter component, said base catalyst consisting essentially of the oxides of antimony and uranium, the Sb:U atomic ratio being within the range of about 1:50 to 99:1, said support being silica and said promoter component being incorporated in the base catalyst and consisting essentially of an oxide of at least one element selected from the group consisting of bismuth, tin, platinum, boron, magnesium, silver, iron, zirconium, copper, thorium, zinc, cobalt, nickel, lead, arsenic, tungsten, phosphorous, aluminum, calcium, cesium, tantalum, germanium, lithium, cadmium, barium, palladium and indium.

2. The process of claim 1 wherein the olefin is butene-2.

3. The process of claim 1 where in the olefin is 2-methylbutene-1.

4. The process of claim 1 wherein the promoter component is iron.

5. The process of claim 1 wherein the promoter component is boron phosphate.

6. The process of claim 1 wherein the promoter component is aluminum phosphate.

7. The process of claim 1 wherein the promoter component is antimony phosphate.

8. The process of claim 1 wherein the promoter component is magnesium.

9. The process of claim 1 wherein the promoter component is thorium.

10. The process of claim 1 wherein the promoter component is cadmium.

References Cited

UNITED STATES PATENTS

| 3,198,750 | 8/1965 | Callahan et al. | 252—456 |
| 3,251,899 | 5/1966 | Callahan et al. | 260—680 |

PAUL M. COUGHLAN, JR., *Primary Examiner.*